US007529837B2

(12) United States Patent
Michimura et al.

(10) Patent No.: US 7,529,837 B2
(45) Date of Patent: May 5, 2009

(54) DEVICE AND METHOD FOR CHANGING INSTRUCTION DESCRIPTION, AND STORAGE MEDIUM STORING PROGRAM FOR CHANGING INSTRUCTION

(75) Inventors: Tadao Michimura, Ebina (JP); Yasuo Tanaka, Kawasaki (JP); Tomonari Yamauchi, Kawasaki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 823 days.

(21) Appl. No.: 10/938,570

(22) Filed: Sep. 13, 2004

(65) Prior Publication Data

US 2005/0165905 A1    Jul. 28, 2005

(30) Foreign Application Priority Data

Jan. 23, 2004  (JP) ............................ 2004-015561

(51) Int. Cl.
*G06F 15/173*  (2006.01)
(52) U.S. Cl. ....................... 709/226; 709/245
(58) Field of Classification Search ....................... None
See application file for complete search history.

(56) References Cited

U.S. PATENT DOCUMENTS

| 6,128,657 | A | * | 10/2000 | Okanoya et al. | ............ 709/224 |
|---|---|---|---|---|---|
| 6,668,276 | B1 | | 12/2003 | Ohkado et al. | |
| 6,961,681 | B1 | * | 11/2005 | Choquier et al. | ............... 703/2 |
| 7,174,379 | B2 | * | 2/2007 | Agarwal et al. | ............. 709/226 |
| 2002/0120744 | A1 | * | 8/2002 | Chellis et al. | ............... 709/226 |
| 2003/0069974 | A1 | * | 4/2003 | Lu et al. | ...................... 709/226 |
| 2004/0054780 | A1 | * | 3/2004 | Romero | ...................... 709/226 |

FOREIGN PATENT DOCUMENTS

CN    1283820    2/2001

* cited by examiner

*Primary Examiner*—Patrice Winder
*Assistant Examiner*—Minh-Chau Nguyen
(74) *Attorney, Agent, or Firm*—Oliff & Berridge, PLC (57) ABSTRACT

The present invention provides a device for changing instruction description. The device includes: a receiving unit that receives an instruction description instructing a processing to be executed by an executing unit and a location of the executing unit; a judging unit that judges whether or not the location instructed by the instruction description indicates a location of a predetermined utilizable executing unit; and a changing unit that changes the location instructed by the instruction description to the location of the predetermined utilizable executing unit which can execute the processing instructed by the instruction description, when the location instructed by the instruction description is not judged to indicate the location of the predetermined utilizable executing unit.

9 Claims, 10 Drawing Sheets

```
<?xml version="1.0 encoding="utf-8" ?>
<definitions targetNamespace="http://foo.com/"         → 202:NAME SPACE
            xmlns="http://schemas.xmlsoap.org/wsdl/"
            xmlns:soap="http://schemas.xmlsoap.org/wsdl/soap/"
            xmlns:xsd="http://www.w3.org/2001/XMLSchema"
            xmlns:tns="http://foo.com/">
  <types>
    <xsd:schema elementFormDefault="qualified"
            targetNamespace="http://foo.com/">
      <xsd:element name="Echo">                         → 203:PARAMETER NAME
        <xsd:complexType>
          <xsd:sequence>
            <xsd:element name="strIn" type="xsd:string"/>
          </xsd:sequence>
        </xsd:complexType>
      </xsd:element>
      <exd:element name="EchoResponse">
        <xsd:complexType>
          <xsd:sequence>
            <xsd:element namae="EchoResult" type="xsd:string"/>
          </xsd:sequence>
        </xsd:complexType>
      </xsd:element>
    </xsd:schema>
  </types>
  <message name="EchoSoapIn">
    <part name="parameters" element="tns:Echo"/>
  </message>
  <message name="EchoSoapOut">
    <part name="parameters" element="tns:EchoResponse"/>
  </message>
  <portType name="EchobackServiceSoap">
    <operation name="Echo">
      <input message="tns:EchoSoapIn"/>
      <output message="tns:EchoSoapOut"/>
    </operation>
  </portType>
  <binding name="EchobackServiceSoap" type="tns:EchobackServiceSoap">
    <soap:binding transport="http://schemas.xmlsoap.org/soap/http"
            style="document"/>
    <operation name="Echo">
      <soap:operation soapAction="http://foo.com/Echo"
            style="document"/>                          → 204:
      <input>                                              SOAP/Action
        <soap:body use="literal"/>
      </input>
      <output>
        <soap:body use="literal"/>
      </output>
    </operation>
  </binding>
  <service name="EchobackService">
    <port name="EchobackServiceSoap" binding="tns:EchobackServiceSoap">
      <soap:address location="http://server.foo.com/EchobackService"/>
    </port>                                             → 205:SERVICE URL
  </service>
</definitions>
```

FIG.3

```
...
<xdf:SoapService name="echo">                                    → 305 : SERVICE URL
   <xdf:ServiceUrl>http://server1.some.vender/echoservice/</ServiceUrl>
   <xdf:SoapAction>http://foo.com/Echo</SoapAction>
   <xdf:RequestMessage>                          → 304 : SOAP/Action
      <Echo xmlns="http://foo.com/">
         <strIn>                                 → 302 : NAME SPACE  303 : PARAMETER NAME
            <xdf:InParam xdf:name="tns:param1" xdf:type="xsd:string"/>
         </strIn>
      </Echo>
   </xdf:RequestMessage>
   <xdf:ResponseMessage>
      <EchoResponse xmlns="http://foo.com/">
         <EchoResult>
            <xdf:OutParam xdf:name="tns:param2" xdf:type="xsd:string"/>
         </EchoResult>
      </Echo>
   </xdf:ResponseMessage>
</xdf:SoapService>
...
```

| SOAP Action | NAME | PARAMETER | SERVICE URL |
|---|---|---|---|
|  |  |  |  |
|  |  |  |  |
| ⋮ | ⋮ | ⋮ | ⋮ |
|  |  |  |  |
|  |  |  |  |

DEVICE AND METHOD FOR CHANGING INSTRUCTION DESCRIPTION, AND STORAGE MEDIUM STORING PROGRAM FOR CHANGING INSTRUCTION

CROSS-REFERENCE TO RELATED APPLICATION

This application claims priority under 35 USC 119 from Japanese Patent Application No. 2004-15561, the disclosure of which is incorporated by reference herein.

BACKGROUND OF THE INVENTION

1. Field of the Invention

The present invention relates to a device and a method for changing instruction description contents and to a recording medium, on which a program for changing instruction description contents is recorded, and in particular, to a device and a method for changing instruction description contents, which change the contents of an instruction description instructing a processing, which is to be executed by an executing unit, and a location of the executing unit, and to a recording medium, on which a program for changing instruction description contents is recorded.

2. Description of the Related Art

It is known to provide distributed processing systems execute a processing by transferring portions of the processing to plural distributed processing objects and combining the results thereof. The object, which receives the transfer of the processing and executes it, is called a service. The object, which transfers the processing and processes the results, is called a client.

In a distributed processing system, the client generally executes a program or an instruction description called a script, and invokes services to delegate some operations and gets the results. This does not presuppose that the client is fixedly dependent on a single device or software; it can also be imagined that the client functions which execute the instruction description are spread over plural devices and software in accordance with the progression of the execution of the instruction description.

As is the case of Microsoft Corporation's COM/DCOM, a conventional distributed processing system is structured so as to set unique (particular) names or identifiers for the respective services, and executes access to the services by referring to an entity realizing the services and the names or identifiers, e.g., a database in which are recorded the names of hosts and the names of programs at which the services are executed.

With such a structure, a client using a service can invoke the service using the name or the identifier, and it is possible to structure a system, which does not depend on the individual client and the server.

There are the following problems with the above-described method of a conventional distributed processing system. One problem is that, because the service is determined by its unique name, a database stating the relationships between names and services must be maintained. Depending on the case, this maintenance operation may become complicated.

For example, let us consider the case of a business performance record service. In an office or the like which has plural business divisions, there is a business performance record service for each of the divisions. When the business performance records must be managed individually, business performance record services are prepared for each of the business divisions as services having different unique names. Either plural clients reference services which are provided for each of the business divisions, or a database which registers the unique names and the services is prepared for each of the business divisions and each is managed independently, or another method is employed. In any case, there is the possibility that managing of the services and the clients will become complex.

In particular, when plural clients are started-up and operated at a shared device, such management becomes extremely complex.

SUMMARY OF THE INVENTION

The present invention has been made in view of the above circumstances, and provides a device and a method for changing instruction description, and a storage medium storing a program for changing instruction description.

A device for changing instruction description of a first aspect of the present invention includes: a receiving unit that receives an instruction description instructing a processing to be executed by an executing unit and a location of the executing unit; a judging unit that judges whether or not the location instructed by the instruction description indicates a location of a predetermined utilizable executing unit; and a changing unit that changes the location instructed by the instruction description to the location of the predetermined utilizable executing unit which can execute the processing instructed by the instruction description, when the location instructed by the instruction description is not judged to indicate the location of the predetermined utilizable executing unit.

Namely, the receiving unit receives an instruction description instructing a processing and a location of an executing unit for executing the processing.

On the basis of a location of an executing unit, which is determined in advance and which can be utilized, and the location of the executing unit instructed by the instruction description received by the receiving unit, the judging unit judges whether or not the location instructed by the instruction description indicates the location of the executing unit which is determined in advance and which can be utilized.

When the location instructed by the instruction description is judged to not indicate the location of the executing unit which is determined in advance and which can be utilized, the changing unit changes the location instructed by the instruction description to the location of the executing unit which is determined in advance and which can be utilized and which can execute the processing instructed by the instruction description.

In this way, even in a case in which the location which is instructed by the instruction description does not indicate the location of the executing unit which is determined in advance and which can be utilized, the location instructed by the instruction description is changed to the location of the executing unit which is determined in advance and which can be utilized and which can execute the processing instructed by the instruction description. Therefore, even an instruction description, which does not instruct the executing unit, which is determined in advance and which can be utilized, can be used.

A method for changing an instruction description of a second aspect of the present invention has operation and effects, which are similar to those of the above-described device for changing instruction description contents of the first aspect. Therefore, description of the method of the second aspect will be omitted. Further, a storage medium storing a program of instructions executable by the computer to perform a function for changing an instruction description of a third aspect of the present invention has operation and effects which are similar to those of the above-described device for changing instruction description contents of the first aspect. Therefore, description of the recording medium of the third aspect will be omitted.

As described above, in accordance with the present invention, even in a case in which a location instructed by an instruction description does not indicate the location of an executing unit which is determined in advance and which can be utilized, the location instructed by the instruction description is changed to the location of the executing unit which is determined in advance and which can be utilized and which can execute the processing instructed by the instruction description. Therefore, the present invention has the effect that even an instruction description, which does not instruct an executing unit, which is determined in advance and which can be utilized, can be used.

BRIEF DESCRIPTION OF THE DRAWINGS

Embodiments of the present invention will be described in detail based on the following figures, wherein:

FIG. 2 is a diagram showing an example of service specifications described in WSDL;

DETAILED DESCRIPTION OF THE INVENTION

A first embodiment of the present invention will be described in detail with reference to the drawings.

Figure 1:
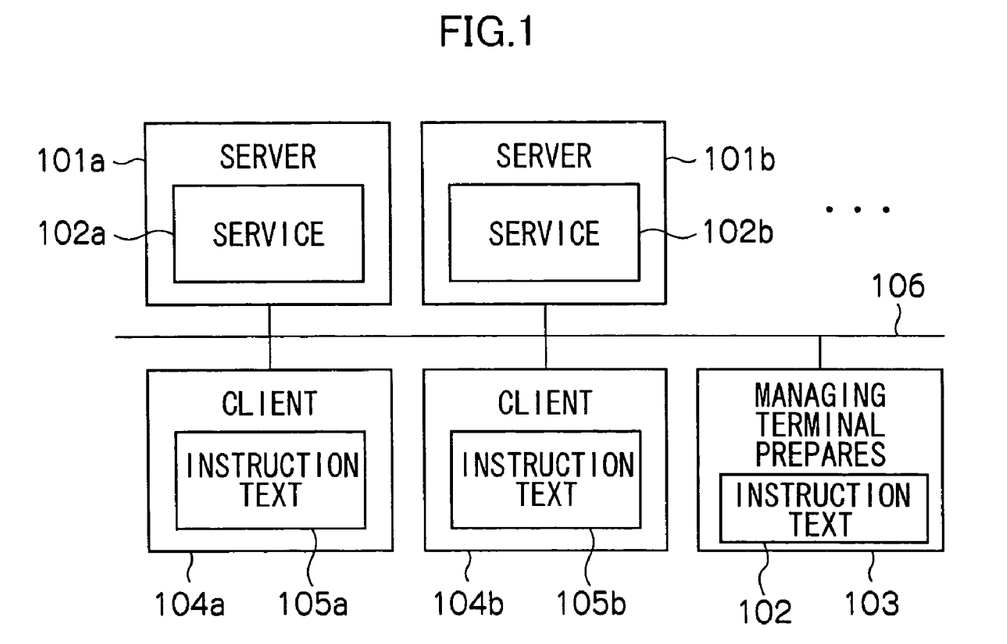
FIG. 1 is a block diagram showing a distributed processing system relating to a first embodiment of the present invention.

As shown in FIG. 1, a distributed processing system relating to the present embodiment has a server 101a in which a service 102a is installed, a server 101b in which a service 102b is installed, . . . , as executing unit, and a managing terminal 103 which serves as a device for changing instruction description contents and which prepares an instruction text 105 stating processing requests and the like with respect to the services 102a, 102b, and clients 104a, 104b carrying out processings in accordance with instruction texts 105a, 105b, . . . prepared at the managing terminal 103.

The servers 101a, 101b, . . . , the managing terminal 103, and the clients 104a, 104b, . . . are connected by a network 106. The instruction texts 105a, 105b, . . . are stored at the clients 104a, 104b, . . . . The servers 101a, 101b, . . . , the managing terminal 103, and the clients 104a, 104b, . . . , are structured so as to include a CPU, a ROM, a RAM, a display device, an input device, a memory, an interface connected to the network 106, and the like.

The services 102a, 102b, . . . are structured in accordance with a Web service protocol, and the service specifications thereof are described by WSDL (Web Service Description Language).

As shown in FIG. 2, in the service specifications (the Web service), the request/response format of the service is instructed by SOAPAction 204, a name space 202 of the SOAP message, a parameter name 203, and the like. By appropriately setting the SOAPAction 204, the name space 202 of the SOAP message, and the parameter name 203, the function (processing contents) of the Web service can be identified uniquely by the interface. Further, because the Web service carries out the communication of requests/responses in accordance with http protocol, a URL 205 (location information) is set for each service. The SOAPAction 204, the name space 202 of the SOAP message, and the parameter name 203, and the service URL 205 can be obtained by referring to the WSDL as shown in FIG. 2.

Figure 3:
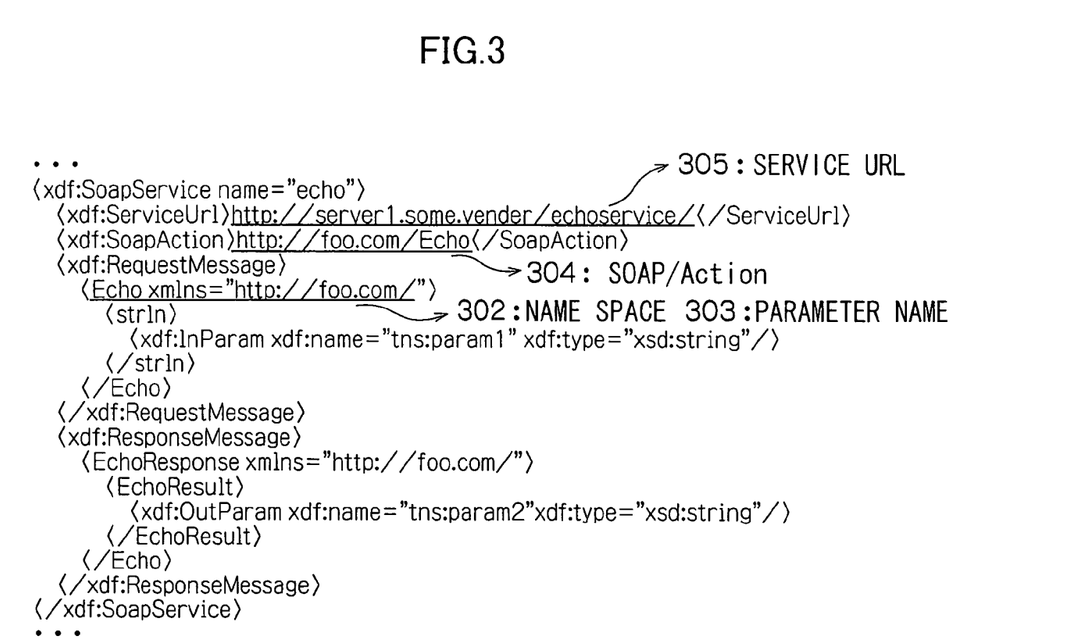
FIG. 3 is a diagram showing a portion of an instruction text.

On the other hand, for the instruction texts 105a, 105b, . . . , the functions are to be used through which interface, and the parameter format is what kind of format, are defined by a service URL 305, a SOAPAction 304, a name space 302 of the SOAP message, and a parameter name 303, as shown in FIG. 3 which shows the portion defining the service which that instruction text 105a, 105b, . . . , uses.

By interpreting the instruction text 105a, 105b, . . . by using the appropriate XML parser, the SOAPAction 304, the name space 302 of the SOAP message, the parameter name 303, the service URL 305, and the like can be acquired. Conversely, the instruction text can be reconstructed from this information.

Next, operation of the present embodiment will be described. In the present embodiment, a case will be described in which an instruction text is used at a site other than the site at which it was originally intended for use. A case in which, for example, an instruction text prepared by a system integrator or the like is used, is considered here as a case in which an instruction text is used at a site other than that for which it was originally intended.

As shown in FIGS. 2 and 3, at the system integrator and at the environment of actual use, the servers, in which the services are set, are different. Thus, the instruction text cannot be used as is, and the service URL 305, which is the location information of the service within the instruction text, must be changed in accordance with the usage environment.

For example, as shown in FIG. 2, in the WSDL of the service 102, the service URL 205 indicates "http://server.foo.com/EchobackService". However, in the instruction text of FIG. 3, "http://server1.some.vender/echoservice/", which is the URL of the server used when this instruction text was prepared, is given by the URL 305. Accordingly, if an attempt is made to execute processing by using this instruction text as is, the server "server1.some.vender" will not be able to be used from the environment of the user, and the processing will fail.

In order to avoid such a processing failure, at the point in time when the instruction text is introduced (imported) at the managing terminal 103, it is necessary to confirm whether or not the instruction text can be executed. When it is judged that an instruction text prepared externally has been introduced, it can be thought to handle the location information of the service within the instruction text by, for example, either, first, the user editing the location information, or, secondly, the location information being changed automatically. Hereinafter, a case in which the location information is changed automatically will be described as an example.

Figure 4:
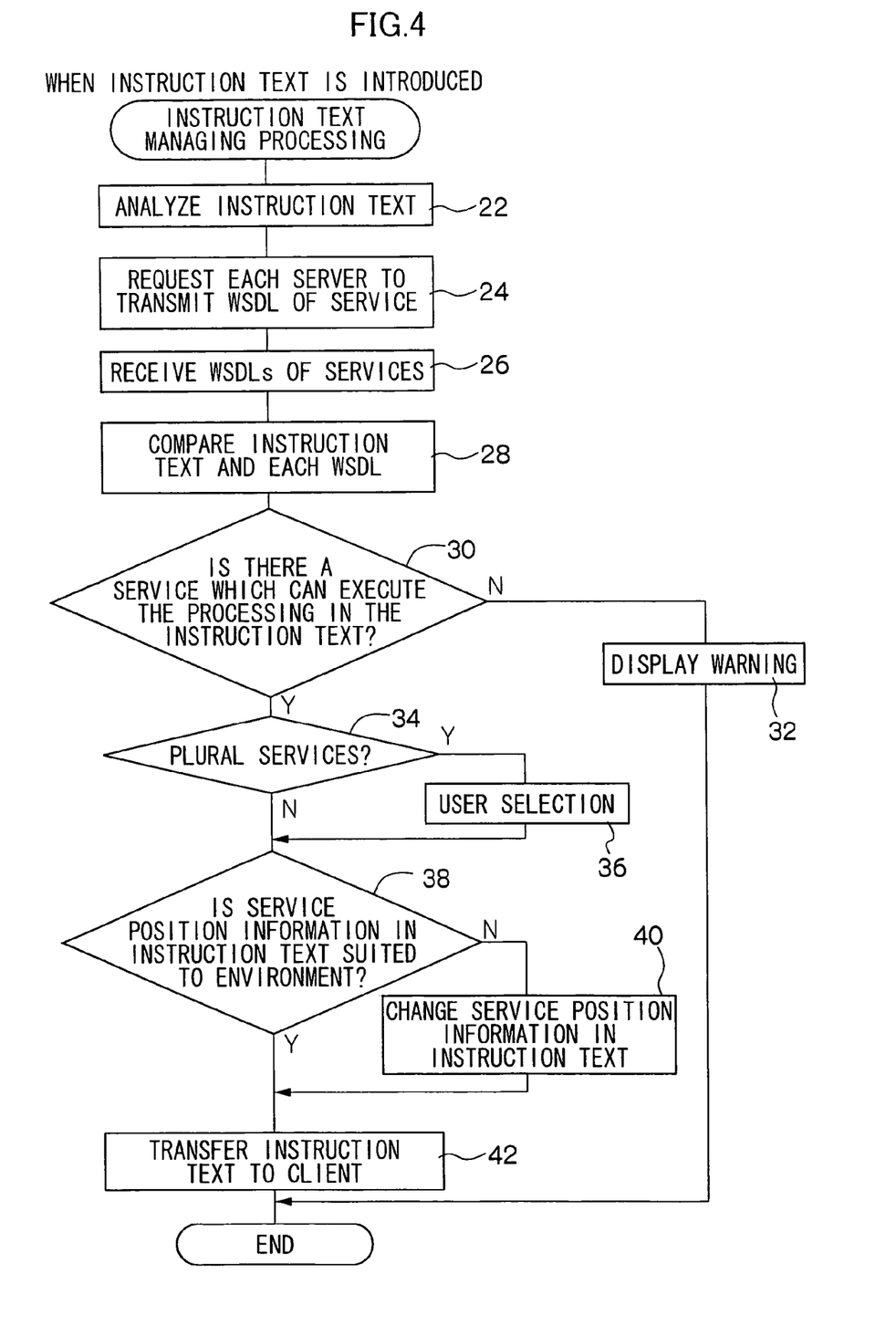
FIG. 4 is a flowchart showing an instruction text managing processing program, which a managing terminal executes.

An instruction text managing processing program, which starts when an instruction text is introduced to the managing terminal 103, is shown in FIG. 4. Note that explanation will be given by using server 101 as a representative of the servers 101a, 101b, . . . , client 104 as a representative of the clients 104a, 104b, . . . , and instruction text 105 as a representative of the instruction texts 105a, 105b, . . . .

When the present instruction text managing program starts, in step 22, the managing terminal 103 reads an instruction text which was prepared by a system integrator or the like, and extracts, for each service URL, the SOAPAction and the SOAP message format of the services 102 which are to be used.

Figure 5:
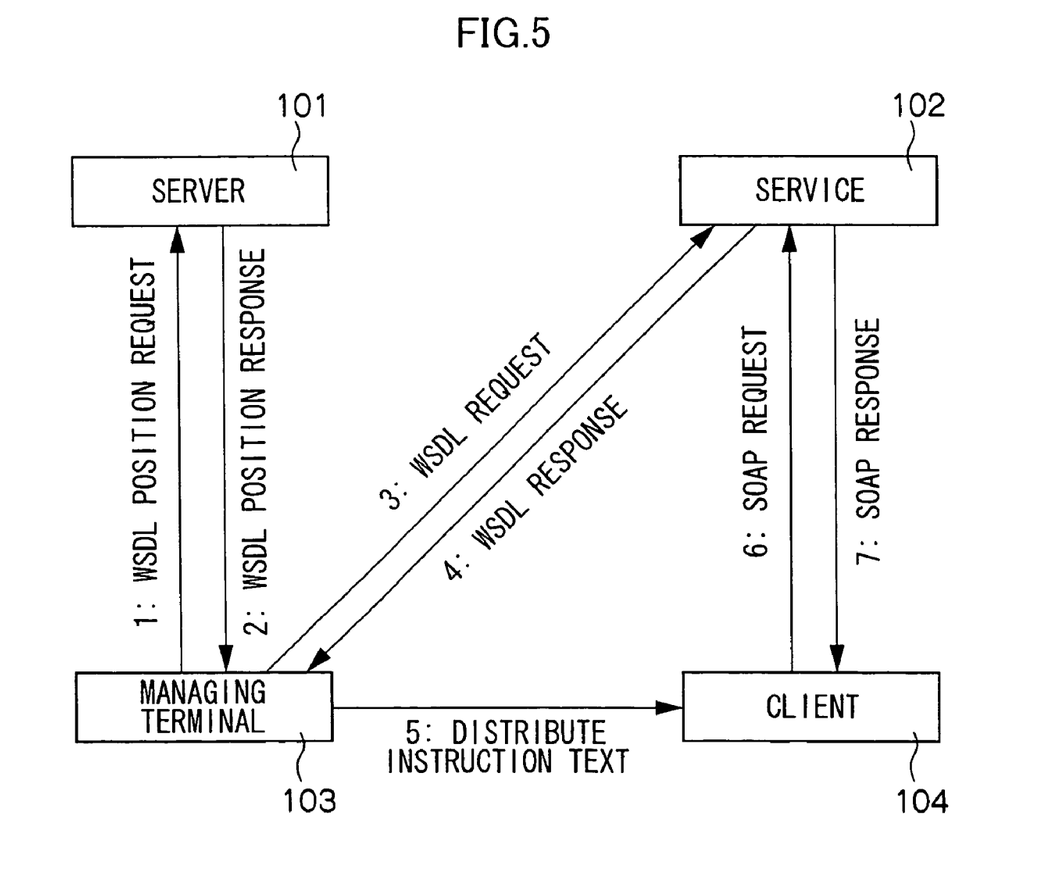
FIG. 5 is a diagram for explaining operation of the first embodiment of the present invention.

In step 24, the managing terminal 103 requests each server 101 for the WSDL location of the service 102 disposed at that server 101 (refer to reference numeral 1 in FIG. 5). From each server 101, the WSDL location of the service 102 disposed at that server 101 returns as a response (refer to reference numeral 2 in FIG. 5). Therefore, the managing terminal 103 refers to these responses, and requests each service 102 for its WSDL (refer to reference numeral 3 in FIG. 5). In response to this request, each service transmits its WSDL to the managing terminal 103 (refer to reference numeral 4 in FIG. 5). Step 26 is thereby executed.

As described above, the service URL, the SOAPAction, and the SOAP message format are stated in the WSDL. Here, in step 28, the managing terminal 103 compares the SOAPActions and the SOAP messages in the WSDLs received as replies from the services 102, with the SOAPAction and the SOAP message in the instruction text.

In step 30, when, on the basis of the results of this comparison, there is no service which can execute the processing in the instruction text, i.e., if there is no WSDL corresponding to the SOAPAction and the SOAP message stated in the instruction text, in step 32, the user of the managing terminal 103 is notified that this instruction text cannot be used, and the routine ends.

On the other hand, if there is a service which can execute the processing in the instruction text, in step 34, it is judged whether or not there are plural services which can execute the processing in the instruction text. If there are plural such services, in step 36, that fact is displayed on the managing terminal 103, the user of the managing terminal 103 selects one of the services, and the routine moves on to step 38. Note that, if it is judged in step 34 that there are not plural services which can execute the processing in the instruction text, the routine moves on to step 38.

In step 38, it is judged whether or not the service location information in the instruction text is suited to the environment. Namely, it is judged whether or not the service location information in the instruction text is not indicating a location within the environment shown in FIG. 1. If the service location information in the instruction text is not suited to the environment, in step 40, the service location information in the instruction text is corrected so as to be suited to the environment. Namely, the service location information in the instruction text is automatically changed to the location information of a service which can execute the processing in the instruction text. For example, in the above example, "http://server1.some.vender/echoservice/", which is service URL 305 in the instruction text in FIG. 3, is automatically changed to "http://server.foo.com/EchobackService", which is service URL 205 in FIG. 2.

Then, in step 42, the instruction text is transferred to the client (refer to reference numeral 5 in FIG. 5).

Thereafter, due to the client 104 interpreting and executing as is the instruction text 105 prepared at the managing terminal 103, issuing of a request to the service 102 and execution of the processing are carried out (refer to reference numerals 6 and 7 in FIG. 5).

As described above, in the present embodiment, when the service location information in the instruction text is not suited to the environment, the service location information in the instruction text is corrected so as to be suited to the environment. Therefore, even when an instruction text is prepared for exterior use, the instruction text can be utilized.

The above-described embodiment presupposes an independent managing terminal which changes the instruction text. However, the present invention is not limited to the same, and it suffices for one of the client and the service to have the above-described functions of the managing terminal. In this case, the client or the service corresponds to the device for changing instruction description contents.

Next, a second embodiment of the present invention will be described. Because the structure of the present embodiment is substantially the same as that of the above-described first embodiment, the same portions will be denoted by the same reference numerals, and explanation thereof will be omitted. Description will be given only of the portions which are different.

Figure 6:
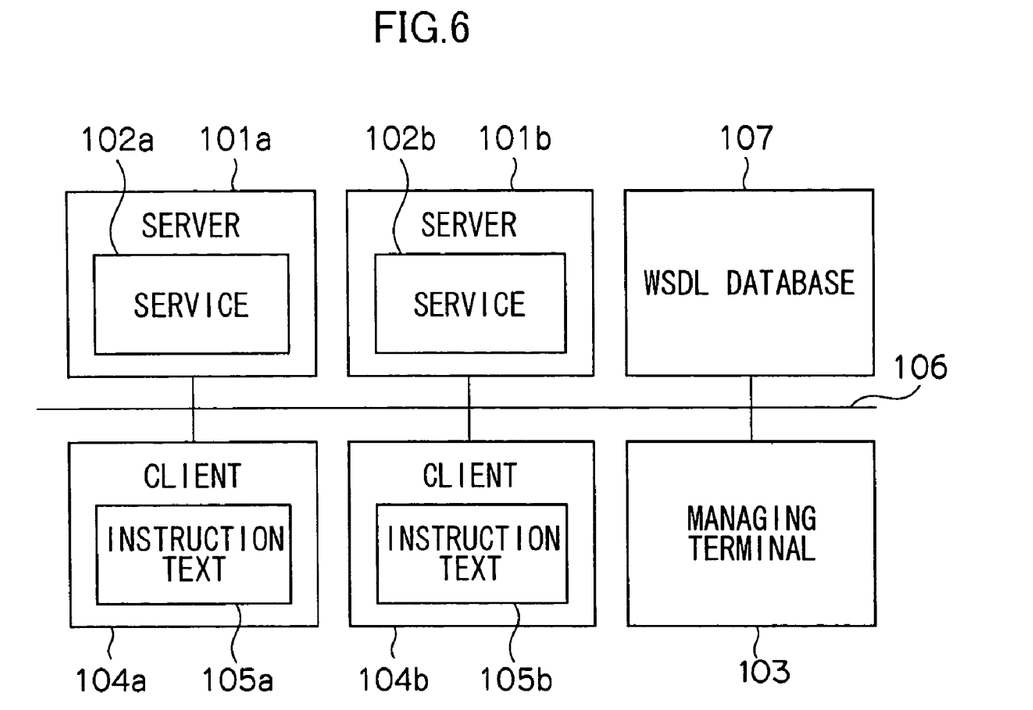
FIG. 6 is a block diagram showing a distributed processing system relating to a second embodiment of the present invention.

As shown in FIG. 6, the distributed processing system of the present embodiment differs from the distributed processing system of the first embodiment in that a WSDL database 107 serving as a managing unit is provided in the present embodiment. When a service 102 is set at a server 101, registration of the WSDL of the service 102 is carried out at the WSDL database 107 either automatically or by instruction of a user. The WSDL database 107 can be referred to when the managing terminal 103 changes the instruction text.

Next, operation of the present embodiment will be described. The operation of the present embodiment is substantially the same as that of the previously described first embodiment. Therefore, the same portions will be denoted by the same reference numerals, and explanation thereof will be omitted. Description will be given only of the portions which are different.

Explanation will be given of the processings which the service 102, the WSDL database 107 and the like execute when the service 102 is set at the server 101.

Figure 7:
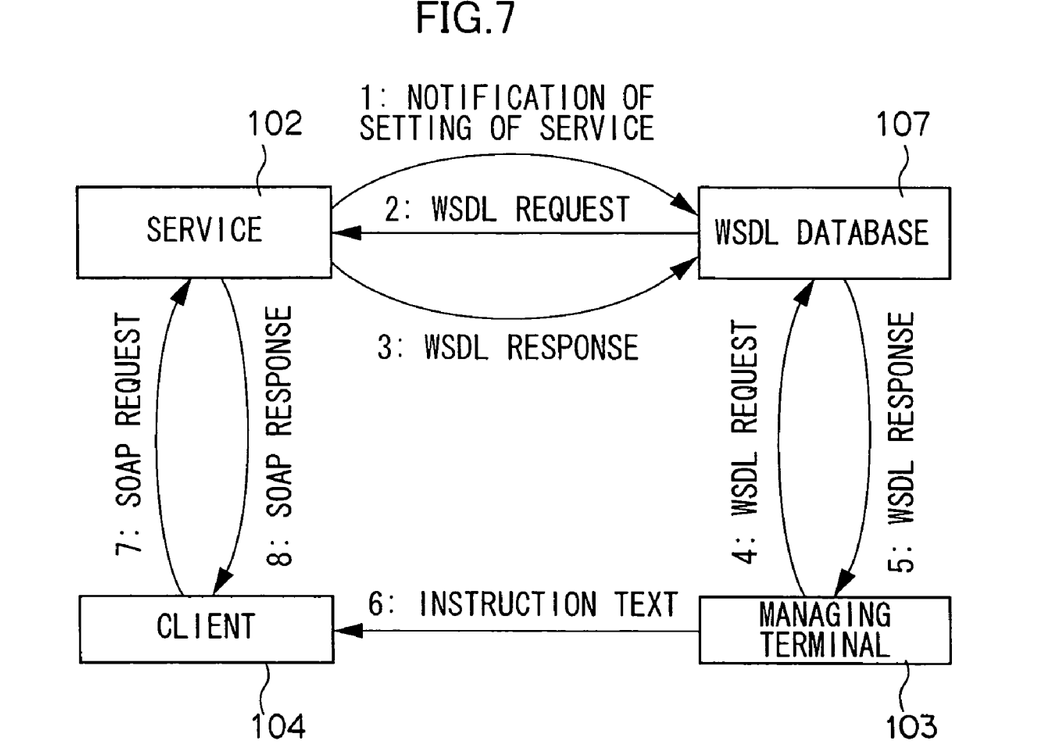
FIG. 7 is a diagram for explaining operation of the second embodiment of the present invention.
Figure 8:
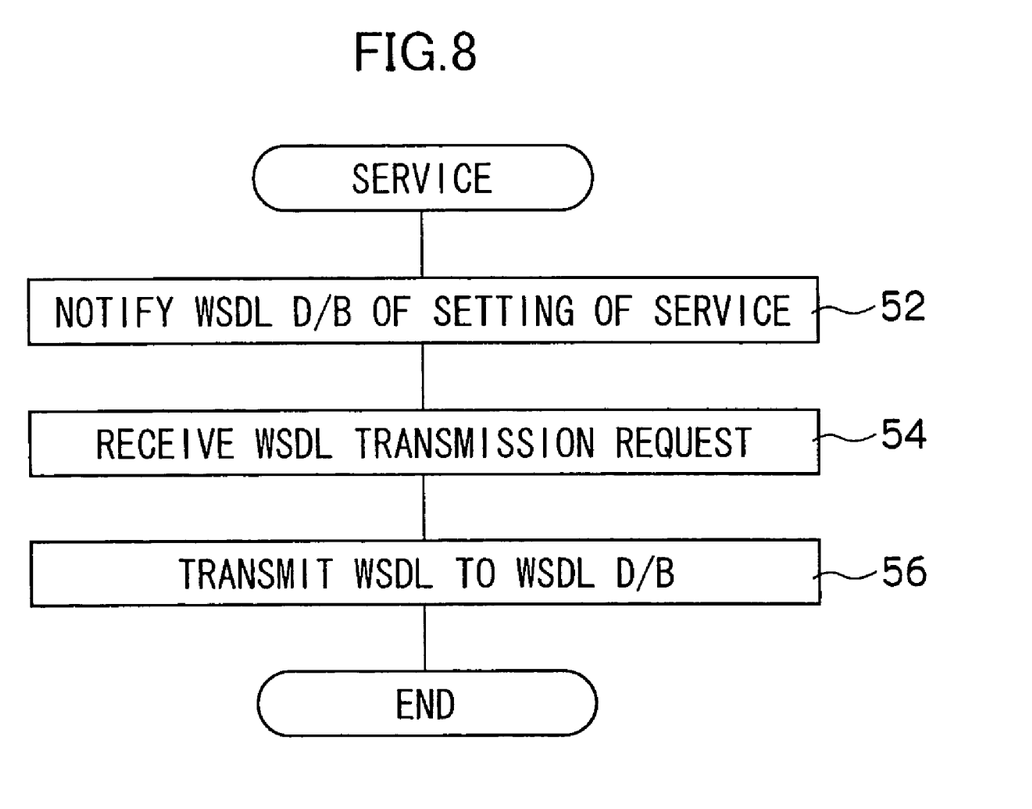
FIG. 8 is a flowchart showing a processing program, which is executed by a service when the service is introduced to a server.

When the service 102 is set at the server 101, in step 52 of FIG. 8, the service 102 notifies the WSDL database 107 that the service 102 has been set (refer to reference numeral 1 in FIG. 7).

Figure 9:
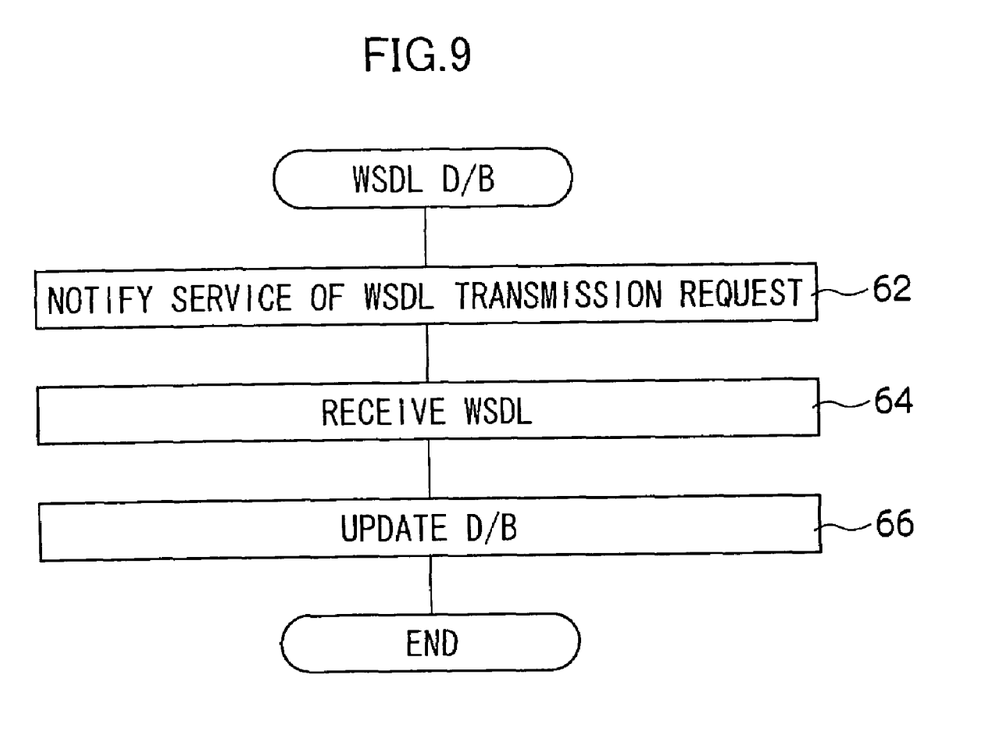
FIG. 9 is a flowchart showing a processing program which a WSDL database executes when a service is introduced to a server.

In step 62 of FIG. 9, the WSDL database 107, which has been notified that the service 102 has been set, sends a WSDL transmission request to the set service 102 (refer to reference numeral 2 in FIG. 7).

In step 56, the service 102 which has received the WSDL transmission request (step 54 in FIG. 8) transmits the WSDL of that service 102 to the WSDL database 107 (refer to reference numeral 3 in FIG. 7).

Figure 10:
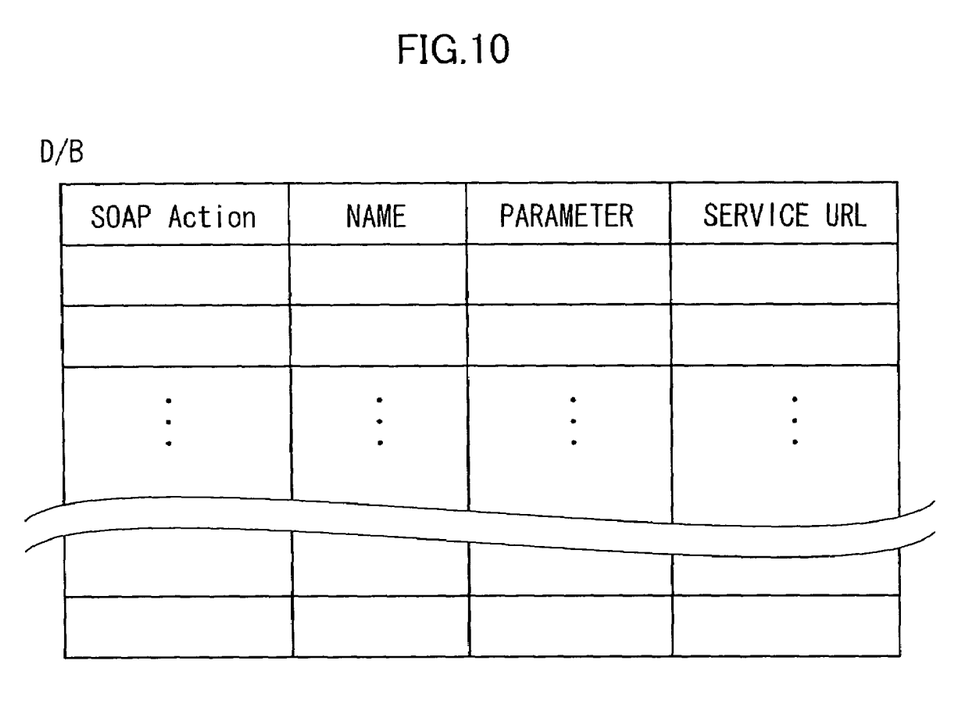
FIG. 10 is a diagram showing the contents of a WSDL database.

In this way, the WSDL database 107 receives the WSDL of the service 102 (step 64 in FIG. 9), and in step 66, updates the database shown in FIG. 10.

Note that the processings which the managing terminal 103 executes at the time when the instruction text is introduced are substantially the same as those of the above-described first embodiment. To explain briefly, the instruction text is read, and the SOAPAction and SOAP message format of the service 102 being used are extracted for each service URL. Then, the managing terminal 103 requests the WSDL database 107 for the registered WSDLs (refer to reference numeral 4 in FIG. 7). The managing terminal 103 receives the registered WSDLs from the WSDL database 107 (refer to reference numeral 5 in FIG. 7).

As described above, the service URL and the SOAPAction and SOAP message format are stated in each WSDL. The managing terminal compares the previously-extracted SOAPAction and the SOAP message in the instruction text, and the SOAPActions and the SOAP messages in the WSDLs returned from the WSDL database 107, and changes the service URL in the instruction text to the URL of the corresponding service 102, and updates the instruction text.

Note that, in the same way as in the above-described first embodiment, if there is no WSDL which corresponds to the SOAPAction and the SOAP message stated in the instruction text, the user of the managing terminal 103 is notified that the instruction text cannot be utilized, and the routine ends.

When plural WSDLs corresponding to the SOAPAction and the SOAP message stated in the instruction text are detected, that fact is displayed on the managing terminal 103, and the user of the managing terminal 103 chooses.

The updated instruction text is transferred from the managing terminal 103 to the client 104.

Note that a structure is possible in which, on the managing terminal 103, the instruction text is shared with the client 104, and the instruction text can be utilized from the client 104.

Due to the client 104 interpreting and executing as is the instruction text 105 prepared at the managing terminal 103, the client carries out issuance of a request to the service 102 and execution of the processing.

Because the service specifications of the service 102 are stated in the instruction text 105, in the issuing of the request to the service 102, there is no need for communication with the WSDL database 107.

The distributed processing system of the present embodiment presupposes an independent managing terminal which carries out changing of the instruction text. However, in the same way as in the first embodiment, it is of course possible for one of the client and the service to have the functions of the managing terminal. In this case, the client or the service corresponds to the device for changing instruction description contents.

As described above, the device for changing instruction description contents of an aspect of the present invention includes: receiving unit for receiving an instruction description instructing a processing and a location of an executing unit for executing the processing; judging unit for, on the basis of a location of an executing unit, which is determined in advance and which can be utilized, and the location of the executing unit instructed by the instruction description received by the receiving unit, judging whether or not the location instructed by the instruction description indicates the location of the executing unit which is determined in advance and which can be utilized; and changing unit for, when the location instructed by the instruction description is judged to not indicate the location of the executing unit which is determined in advance and which can be utilized, changing the location instructed by the instruction description to the location of the executing unit, which is determined in advance and which can be utilized and which can execute the processing instructed by the instruction description.

In the device for changing instruction description contents, the receiving unit may be structured so as to be able to receive the location of the executing unit which is determined in advance and which can be utilized, from the executing unit which is determined in advance and which can be utilized, or from a managing unit for managing the processing executed by the executing unit, which is determined in advance and which can be utilized, and the location of the executing unit.

The judging unit may judge whether or not the location instructed by the instruction description indicates the location of the executing unit which is determined in advance and which can be utilized, on the basis of the location of the executing unit, which is determined in advance and which can be utilized, which location is received by the receiving unit, and on the basis of the location of the executing unit instructed by the instruction description.

What is claimed is:

1. A device for changing instruction description comprising:
   a receiving unit that receives an instruction description having a parameter instructing a processing to be executed by an executing unit and a parameter specifying a location of the executing unit;
   a judging unit that judges whether or not the location instructed by the instruction description indicates a location of a predetermined utilizable executing unit out of one or more predetermined utilizable executing units; and
   a changing unit that changes the location instructed by the instruction description to the location of one of the predetermined utilizable executing units which can execute the processing instructed by the instruction description, when the location instructed by the instruction description is not judged to indicate the location of the predetermined utilizable executing unit.

2. The device of claim 1, wherein
   the receiving unit can receive the location information of the predetermined utilizable executing unit from the predetermined utilizable executing unit or a managing unit which manages the processing executed by the executing unit and the location of the executing unit, and
   the judging unit judges whether or not the location instructed by the instruction description indicates the location of the predetermined utilizable executing unit on the basis of the received location information.

3. The device of claim 1, wherein
   the one or more predetermined utilizable executing units constitutes a plurality of predetermined utilizable executing units,
   the changing unit communicates to a user the existence of the plurality of predetermined utilizable executing units, and
   the changing unit then changes the location instructed by the instruction description to the location of one of the plurality of predetermined utilizable executing units based on input from the user.

4. A method for changing an instruction description to be executed by an executing unit comprising:
   receiving the instruction description having a parameter instructing a processing and a parameter specifying a location of the executing unit;
   judging whether or not the location instructed by the instruction description indicates a location of a predetermined utilizable executing unit out of one or more predetermined utilizable executing units; and
   changing the location instructed by the instruction description to the location of one of the predetermined utilizable executing units which can execute the processing instructed by the instruction description, when the location instructed by the instruction description is not judged to indicate the location of the predetermined utilizable executing unit.

5. The method of claim 4, wherein
in the step of receiving, further receiving the location information of the predetermined utilizable executing unit from the predetermined utilizable executing unit or a managing unit which manages the processing executed by the executing unit and the location of the executing unit, and
in the step of judging, judging whether or not the location instructed by the instruction description indicates the location of the predetermined utilizable executing unit on the basis of the received location information.

6. The method of claim 4, wherein
the one or more predetermined utilizable executing units constitutes a plurality of predetermined utilizable executing units, the method further comprising:
communicating to a user the existence of the plurality of predetermined utilizable executing units, and
changing the location instructed by the instruction description to the location of one of the plurality of predetermined utilizable executing units based on input from the user.

7. A storage medium readable by a computer, the storage medium storing a program of instructions executable by the computer to perform a function for changing an instruction description to be executed by an executing unit, the function comprising:
receiving an instruction description having a parameter instructing a processing to be executed by an executing unit and a parameter specifying a location of the executing unit;
judging whether or not the location instructed by the instruction description indicates a location of a predetermined utilizable executing unit out of one or more predetermined utilizable executing units; and
changing the location instructed by the instruction description to the location of one of the predetermined utilizable executing units which can execute the processing instructed by the instruction description, when the location instructed by the instruction description is not judged to indicate the location of the predetermined utilizable executing unit.

8. The storage medium of claim 7, wherein
in the step of receiving, further receiving the location information of the predetermined utilizable executing unit from the predetermined utilizable executing unit or a managing unit which manages the processing executed by the executing unit and the location of the executing unit, and
in the step of judging, judging whether or not the location instructed by the instruction description indicates the location of the predetermined utilizable executing unit on the basis of the received location information.

9. The storage medium of claim 7, wherein
the one or more predetermined utilizable executing units constitutes a plurality of predetermined utilizable executing units, the function further comprising:
communicating to a user the existence of the plurality of predetermined utilizable executing units, and
changing the location instructed by the instruction description to the location of one of the plurality of predetermined utilizable executing units based on input from the user.

* * * * *